(12) United States Patent
Wilson et al.

(10) Patent No.: US 11,505,294 B2
(45) Date of Patent: Nov. 22, 2022

(54) SUBSEA GARAGES FOR UNMANNED UNDERWATER VEHICLES

(71) Applicant: Subsea 7 Limited, Sutton (GB)

(72) Inventors: Lee Wilson, Insch (GB); James Andrew Jamieson, Balmedie (GB); Wayne Sherry, Aberdeen (GB)

(73) Assignee: Subsea 7 Limited, Sutton (GB)

( * ) Notice: Subject to any disclaimer, the term of this patent is extended or adjusted under 35 U.S.C. 154(b) by 582 days.

(21) Appl. No.: 16/467,967

(22) PCT Filed: Dec. 12, 2017

(86) PCT No.: PCT/GB2017/053711
§ 371 (c)(1),
(2) Date: Jun. 8, 2019

(87) PCT Pub. No.: WO2018/109451
PCT Pub. Date: Jun. 21, 2018

(65) Prior Publication Data
US 2020/0086961 A1 Mar. 19, 2020

(30) Foreign Application Priority Data
Dec. 16, 2016 (GB) ...................................... 1621519

(51) Int. Cl.
*B63G 8/00* (2006.01)
*G05D 1/10* (2006.01)
(52) U.S. Cl.
CPC ............... *B63G 8/001* (2013.01); *G05D 1/10* (2013.01); *B63G 2008/008* (2013.01)

(58) Field of Classification Search
CPC ..... B63G 2008/008; B63G 8/001; G05D 1/10
See application file for complete search history.

(56) References Cited

U.S. PATENT DOCUMENTS

| 8,109,223 | B2 | 2/2012 | Jamieson | |
| 9,845,137 | B2* | 12/2017 | Lelaurin | B63G 8/001 |
| 9,944,370 | B2* | 4/2018 | Jamieson | B63G 8/001 |
| 10,279,878 | B2* | 5/2019 | Sakaue | B63C 11/00 |

(Continued)

FOREIGN PATENT DOCUMENTS

| EP | 2 196 622 | 6/2010 |
| EP | 2 762 401 | 8/2014 |

(Continued)

*Primary Examiner* — Tyler J Lee
(74) *Attorney, Agent, or Firm* — Levy & Grandinetti (57) ABSTRACT

A subsea garage for an unmanned underwater vehicle (UUV) has a body having a receptacle for the UUV, an open top providing a transit path for the UUV into and out of the receptacle and a base opposed to the open top, the base being arranged to lie on the seabed. At least one post is movable, subsea, relative to the body into a deployed position extending upwardly from the body above the open top. A lid may also be movable relative to the body between a closed position that closes the open top and an open position that allows the UUV to move along the transit path through the open top. A fixed post may extend upwardly from the body above the open top, in which case the lid may enclose the post when in the closed position and expose the post when in the open position.

34 Claims, 11 Drawing Sheets

(56) References Cited

U.S. PATENT DOCUMENTS

2014/0140170 A1* 5/2014 Brizard .................. B63G 8/08
                                                    367/16
2015/0376851 A1   12/2015 Yu et al.
2016/0266250 A1*  9/2016 Dillon .................. G10K 11/008
2018/0319473 A1* 11/2018 Sakaue .................. B63C 11/48

FOREIGN PATENT DOCUMENTS

| GB | 2460668 | 12/2009 |
|----|---------|---------|
| GN | 1132710 | 10/1996 |
| NZ | 554981 | 8/2007 |
| WO | WO 00/71415 | 11/2000 |
| WO | WO 01/21476 | 3/2001 |
| WO | WO 01/53149 | 7/2001 |
| WO | WO 2012/156425 | 11/2012 |
| WO | WO 2013/050411 | 4/2013 |
| WO | WO 2014/173976 | 10/2014 |
| WO | WO 2015/020529 | 2/2015 |

* cited by examiner

SUBSEA GARAGES FOR UNMANNED UNDERWATER VEHICLES

BACKGROUND OF THE INVENTION

This invention relates to subsea baskets or garages for unmanned underwater vehicles or UUVs, especially autonomous underwater vehicles or AUVs.

An AUV is an example of a UUV, another example being a remotely operated vehicle or ROV. UUVs are used widely in the subsea oil and gas industry to perform subsea inspections and interventions. They may be used wherever it is inappropriate or impossible to use divers.

Conventionally, a UUV is handled from a surface support vessel. The support vessel manages launch and recovery of the UUV, typically using a launch and recovery system (LARS). A LARS may, for example, comprise a cursor that slides into and out of the water along vertical rails fixed to the vessel.

Where the UUV is an ROV, a pilot flies the ROV during its subsea mission. Typically the pilot is based aboard the surface support vessel, to which the ROV remains tethered throughout.

Where the UUV is an AUV, the AUV flies itself automatically during its subsea mission in accordance with a predetermined program or in response to events that arise during the mission. Typically the AUV is untethered but flies itself back to a subsea garage or docking station periodically for battery charging and data transfer. This saves the complexity and delay of recovering the AUV to the surface on each occasion.

More generally, there is a trend toward permanent or indefinite subsea installation of UUVs to provide a resident capability at a subsea site. The UUV will typically have access to a subsea docking station that is connected to nearby subsea infrastructure for power and communications.

For ROVs, a tether management system (TMS) may be used as a simple subsea docking station or as a garage. For example, in WO 2001/53149, an ROV is docked to the TMS when required. In WO 2015/020529, an ROV enters a frame between missions. However as ROVs remain physically connected to the surface support vessel, there is no need for a more sophisticated garage of the kind required by AUVs.

For AUVs, the most common subsea docking solutions involve a simple docking station for battery charging as in WO 2001/21476 and US 2015/376851. Another common approach, especially when an AUV is torpedo-shaped, is a lateral-entry garage—an example of which is disclosed in WO 2000/71415.

Some suspended lateral-entry AUV garages or bases are known, for example as disclosed in WO 2014/173976. However, suspended structures are not practical for use as a permanent garage on the seabed because the entrance opening would then be at the level of the mudline, which would hinder AUV entry. In WO 2013/050411, for example, an AUV garage is mounted on a wellhead template and so has its entrance opening above the mudline.

In the Applicant's U.S. Pat. No. 8,109,223, the launch and recovery function for an AUV is realised by a top-entry basket that is lowered to the seabed containing the AUV. The basket is left on the seabed to provide a subsea garage or docking station to which the AUV returns when battery charging and/or data transfer is required.

Noting that AUVs operate on the principle of autonomy, a displaceable or relocatable garage like the basket of U.S. Pat. No. 8,109,223 allows more autonomy. The basket design even allows the garage to be separated from a support vessel to create a permanent garage on the seabed. However it remains possible eventually to recover the basket to the surface, either with or without an AUV inside.

In WO 2012/156425, an AUV garage is embedded in a static structure. This is not as practical or flexible as the basket solution in U.S. Pat. No. 8,109,223 because the garage cannot be moved, which makes it impractical to recover the garage with or without the AUV. However, an advantage of embedding an AUV garage into a static structure is that it mitigates the risk of damage to the garage. Specifically, the structure provides solid frames that protect the roof of the garage against dropped objects and against fishing activity such as over-trawling, whether or not an AUV is housed inside.

It is straightforward to reinforce the roof of a lateral-entry AUV garage for protection against dropped objects and over-trawling. However, it is not straightforward to confer such protection on a top-entry AUV garage like the basket of U.S. Pat. No. 8,109,223. In this respect, automation of recognition and docking of an AUV is more efficient with than with a lateral-entry garage because the AUV can arrive from any direction and exit in any direction. Thus, a rigid upstanding structure comprising posts like that of U.S. Pat. No. 8,109,223 is used as an identifying feature by an AUV's vision systems. However, the posts are a potential snagging point for trawl fishing nets. Also, an open-topped basket tends to be vulnerable to dropped objects.

In principle, these problems could be solved by fitting a large protection structure over an entire subsea docking station or garage. However, such a solution would be complex to install, would hamper access required to raise or move the garage and would require a UUV to adapt its docking routine to suit the protection structure.

EP 2196622 describes a module for performing interventions on a subsea wellhead, the module having a supporting structure and attachment means to enable docking with a wellhead structure. Once docked, the module performs tasks on the welhead using tools stored on the module.

An apparatus for sampling and analysing fluid from a subsea well is described in GB 2460668. The apparatus includes a fluid processing device contained within a housing which can be positioned in close proximity to the wellhead for use.

CN 1132710 describes an underwater recovery and control system for an autonomous underwater robot, the system including a rescue vessel for recovery of the robot to a base ship.

In NZ 554981, an ROV is lowered to a worksite in a lateral-entry cage which remains suspended above the worksite while the ROV carries out tasks.

WO 2012/156425 describes an AUV for monitoring a subsea environment, and an underwater station in which an AUV garage is embedded to house the AUV when not in use.

BRIEF SUMMARY OF THE INVENTION

Against this background, the present invention provides a subsea garage for a UUV such as an AUV, the garage comprising: a body having a receptacle for the UUV, an open top providing a transit path for the UUV into and out of the receptacle and a base opposed to the open top, the base being arranged to lie on the seabed; and at least one post that is movable, subsea, relative to the body into a deployed position extending upwardly from the body above the open top.

The or each post is preferably movable, subsea, relative to the body into a retracted position substantially beneath the open top. The or each post may be accommodated within the body or outside the body when in the retracted position, and may translate or rotate when moving relative to the body into the deployed position.

Advantageously, the or each post may have a lifting formation for attachment to a lifting line to lift the subsea garage. Also, a crossbar structure may be attached to the or each post, in which case the crossbar structure may have a lifting formation for attachment to a lifting line to lift the subsea garage.

The subsea garage preferably further comprises a lid that is movable, subsea, relative to the body between a closed position that closes the open top and an open position that allows the UUV to move along the transit path through the open top. Elegantly, the or each post may be linked to the lid to move the lid into the open position on deployment of the post. In another approach, the or each post may be linked to the lid to be deployed in response to movement of the lid into the open position. Alternatively, the or each post may be movable relative to the body for deployment after opening movement of the lid.

The lid may also have a lifting formation for attachment to a lifting line to lift the subsea garage.

Advantageously, the lid may be arranged to lift from the closed position to the open position while remaining over the open top of the body. The lid may be arranged to translate or to rotate from the closed position to the open position. For example, the lid may be arranged to rotate about a substantially horizontal axis or a substantially vertical axis offset to a side of the body.

The lid may be in one piece or in sections that are arranged to move apart from each other as the lid moves from the closed position into the open position. Advantageously, sections of the lid may be arranged to move downwardly as they move apart.

The subsea garage of the invention is preferably responsive to a command from, or presence of, the UUV to move the or each post and any lid into their deployed or open positions.

The inventive concept also embraces a subsea garage for a UUV, the garage comprising: a body having a receptacle for the UUV, an open top providing a transit path for the UUV into and out of the receptacle and a base opposed to the open top, the base being arranged to lie on the seabed; at least one post extending upwardly from the body above the open top; and a lid that is movable subsea relative to the body between a closed position that closes the open top and an open position that allows the UUV to move along the transit path through the open top; wherein the lid encloses the post when in the closed position and exposes the post when in the open position.

In this arrangement, the lid may comprise a top plate that lies over the post and a skirt depending from the top plate, which skirt lies beside the post when the lid is in the closed position. Preferably, the skirt of the lid extends from the top plate to the open top of the body when the lid is in the closed position. The lid is suitably arranged to lift from the closed position to the open position while remaining over the open top of the body.

The inventive concept extends to a method of guiding a UUV into or out of a subsea garage that has an open-topped body. The method comprises: moving at least one post relative to the body, subsea, from a retracted position into a deployed position extending upwardly above the open top of the body; and with reference to the or each post, navigating the UUV along a transit path through the open top into or out of a receptacle within the body.

The or each post may be moved in response to a command from, or presence of, the UUV.

The method of the invention may be preceded or followed by lifting the subsea garage while bearing its weight through at least one post when the or each post is in the deployed position.

A lid may be moved relative to the body, subsea, between a closed position that closes or blocks the open top and an open position that allows the UUV to move along the transit path through the open top. In that case, the or each post may be moved into the deployed position with the lid as the lid moves into the open position. Alternatively, the or each post may be moved into the deployed position after moving the lid into the open position. Where a lid is present, the method of the invention may be preceded or followed by lifting the subsea garage while bearing its weight through the lid when in the closed position.

In the method of the invention, the or each post is preferably in the deployed position during any of the following phases, namely: entry of the UUV into the subsea garage; exit of the UUV from the subsea garage; and docking or undocking of the UUV in or from the subsea garage. Conversely, the or each post is preferably in the retracted position whenever: the UUV is not entering or exiting the subsea garage; and the subsea garage is not being lifted.

The inventive concept also embraces a method of guiding a UUV into or out of a subsea garage having an open-topped body, that method comprising: exposing, subsea, at least one previously-enclosed post that extends upwardly above the open top of the body; and with reference to the or each post, navigating the UUV along a transit path through the open top into or out of a receptacle within the body.

The or each post may be exposed by moving a lid relative to the body, subsea, between a closed position that closes the open top and an open position that allows the UUV to move along the transit path through the open top. Again, the lid is conveniently moved automatically in response to a command from, or presence of, the UUV.

In preferred embodiments, the invention improves prior art solutions by creating a conical or frusto-conical skirt around the base of an AUV basket and implementing a telescopic post structure with a top lid that allows the basket to be enclosed completely when the AUV is in the basket or is out on-mission. When the AUV returns to the basket, it commands the lid to open, thus exposing the post feature that guides the AUV into the basket before the lid closes again. When closed with an AUV in the basket, the lid also acts as a restraint on the AUV during launch and recovery operations.

The invention combines the advantages of hard-top garages, especially against trawling, with the accessibility and flexibility of top-entry baskets. One or more posts support a lid, cover or roof that generally protects the top of the basket. When an AUV approaches the basket or needs to exit the basket, the roof opens in such a way that the or each post is the only potential obstacle to lateral motion of the AUV.

It is preferred that the roof lifts vertically by telescoping or extending two posts. Whether or not there is a roof, another function and advantage of an extensible post arrangement is to simplify connection of a basket lifting line for recovery because the or each post protrudes above the basket structure.

In summary, preferred embodiments of the invention provide a basket for hosting at least one AUV, that basket being arranged to be laid on the seabed. The basket comprises: a basket-shape receptacle comprising at least one inner cavity; and at least one movable post. The movable post is extended during the phase of entry of the AUV into the basket, exit of the AUV from the basket and docking/undocking of the AUV in the basket. One or more movable posts may also be extended to facilitate lifting the basket.

Conversely, the or each movable post may be retracted whenever an AUV is not entering or exiting the basket and whenever the basket is not being lifted. Extension or retraction of a movable post is preferably automated, more preferably in response to movement or planned movement of the AUV.

The or each movable post preferably protrudes upwardly when extended. The movable post may be retractable, telescopic or swinging.

The or each movable post preferably carries at least one lid element that can close the basket and that is capable of diverting incoming trawls. Preferably the lid element is substantially flat. It is also possible for the lid element to comprise at least one retractable means for connection to a lifting line. Similarly, the or each movable post preferably comprises means such as a shackle or padeye for connection to a lifting line.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

Figure 1A:
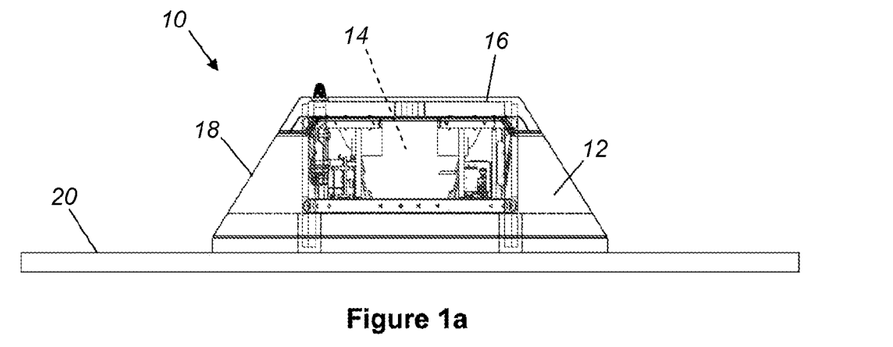
FIGS. 1a and 1b are side views of an AUV basket in a first embodiment of the invention, showing a lid in closed and open positions respectively.
Figure 1B:
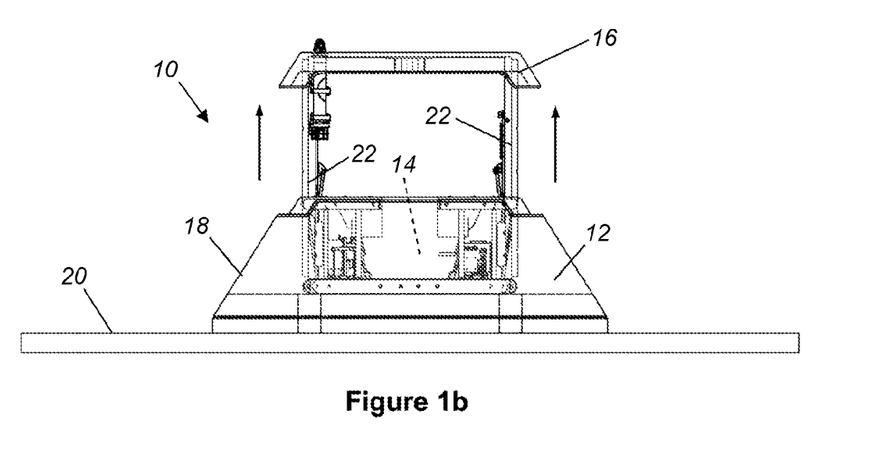

Referring to the first embodiment of the invention shown in FIGS. 1a and 1b of the drawings, a basket 10 for hosting an AUV on the seabed comprises a hollow open-topped body 12. The body 12 is a truncated pyramid with a generally frusto-pyramidal shape. The body 12 surrounds a receptacle 14 into which an AUV (not shown) that enters the body 12 through the open top can dock for protection, recharging, data download and/or data upload for reprogramming.

The open top of the body 12 can be closed by a lid 16 that is movable between the closed position shown in FIG. 1a and the open position shown in FIG. 1b. The lid 16 serves as a cover or roof that protects an AUV docked in the receptacle 14 against objects that may be dropped from above. When closed, the lid 16 also helps to retain the AUV inside the body 12 when the basket 10 is being relocated underwater, launched from the surface or recovered to the surface.

When the basket 10 is empty, the lid 16 can be driven from the closed position into the open position in response to the approach of an AUV. The AUV may be fitted with a transponder for this purpose. In this example, the lid 16 raises vertically from the closed position to the open position and so, when open, remains protectively over the open top of the body 12. The lid 16 remains in a substantially horizontal plane throughout.

When the lid 16 is open, an AUV can access the receptacle 14 by moving generally horizontally to under the lid 16 before lowering through the open top of the body 12 and into the receptacle 14 for docking. The lid 16 can then be closed onto the body 12 over the docked AUV.

With the basket 10 containing an AUV docked in the receptacle 14, the lid 16 is driven into the open position when the AUV is ready to depart. The AUV is then able to undock and move upwardly to exit the receptacle through the open top. The AUV then moves generally horizontally from under the open lid 16 and into the open sea.

In accordance with well-known design principles for trawling protection, generally flat faces or sides 18 of the body 12 slope at an inclination of less than 58° from the horizontal and converge upwardly from a flat base that lies on the seabed 20 in a plane that is generally parallel to the open top of the body 12. For the same reason, the lid 16 covering the top of the basket 10 has minimal protrusions and is preferably also generally flat as shown.

The lid 16 is supported and moved by telescopic guide posts 22. The posts 22 are driven by actuators that extend vertically from the body 12 to lift the lid 16 into the open position and retract vertically to lower the lid 16 into the closed position. When retracted, the posts 22 are accommodated substantially within the body 12.

Thus, the posts 22 are retracted when the lid 16 is closed so as not to present a snagging hazard for fishing nets but are deployed into a protruding upright orientation when the lid 16 is open so as to guide the AUV into the receptacle 14.

Elegantly, in this first embodiment of the invention, the lid 16 opens as a consequence of deploying the posts 22. Conversely, in other embodiments, the posts 22 may be deployed as a consequence of opening the lid 16. It is also possible for the posts 22 to deploy independently of opening the lid 16. Indeed, it is possible for a lid 16 to be omitted so that the posts 20 simply deploy from an open-topped basket that can protect an AUV docked within.

In the further examples of the invention that follow, like numerals are used for like features.

Moving on now to the second embodiment shown in FIGS. 2a to 2d, in this example, the lid 16 of an AUV basket 24 is divided into sections. The sections of the lid 16 move laterally away from each other on opening to expose the receptacle 14 within.

In this example, the body 12 defines only a minor lower portion of the frusto-pyramidal sides 18 of the basket 24. Instead, the sections of the lid 16 extend onto, and define a major upper portion of, those sides 18 of the basket 24.

Figure 2A:
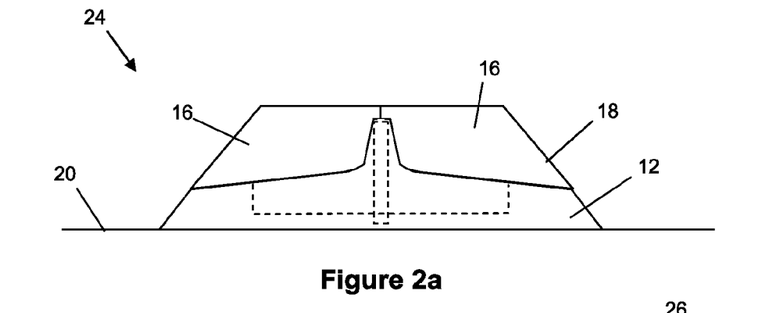
FIGS. 2a to 2d are a sequence of schematic side views of an AUV basket in a second embodiment of the invention, showing the basket with its lid closed, next with the lid open on approach of an AUV, next with a post deployed to guide the AUV and finally with the AUV docked within a receptacle of the basket.
Figure 2B:
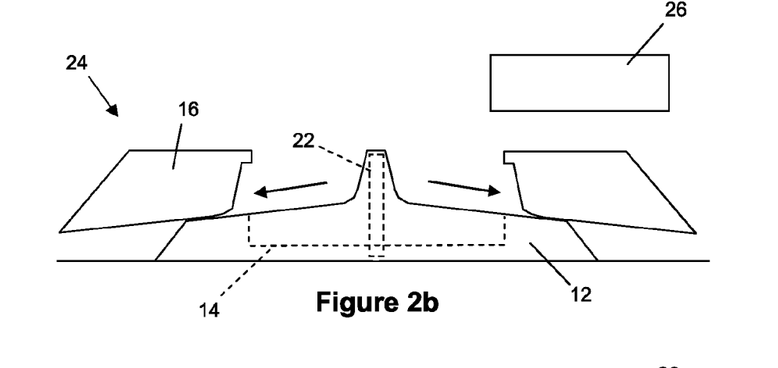
Figure 2C:
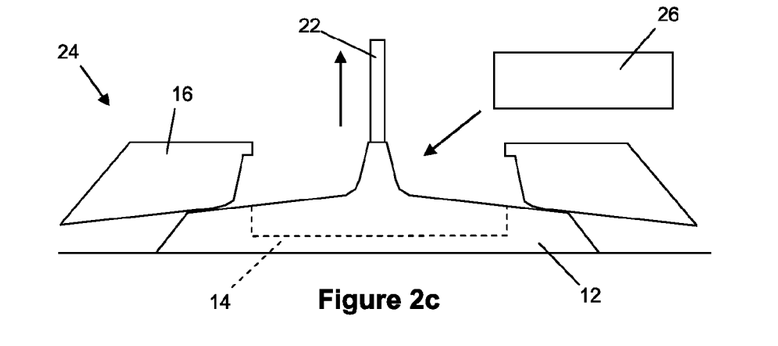

FIG. 2a shows the basket 24 closed. FIGS. 2b and 2c show the basket 24 reacting to the proximity of an AUV 26, for example responding to a signal from a transponder carried by the AUV 26, firstly by opening the lid 16 and then by deploying a post 22 into an upright position over the receptacle 14.

In this example, the post 22 slides upwardly from an initially retracted position with translational movement but it could instead swing or pivot into a deployed position, as other embodiments to be described below will demonstrate. It is also possible for the post 22 to retract to a position outside the body 12 rather than inside the body 12.

Figure 2D:
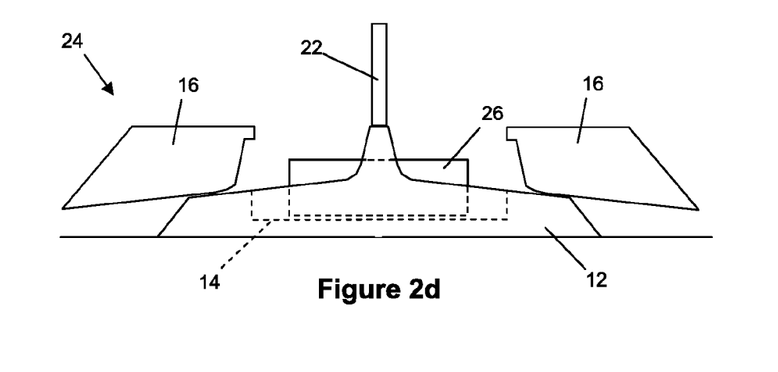

In addition to moving horizontally, the sections of the lid 16 move downwardly on opening. This maximises the opening available for access to the receptacle 14 by the AUV 26 along a transit path as shown in FIGS. 2c and 2d. The sections of the lid 16 may be supported on inclined runners, sliding bearings or linkages to effect translational movement relative to the body 12 as shown. In other embodiments, pivotal or other angular movement of a lid 16 relative to a body 12 is possible, as will be described below.

Figure 3A:
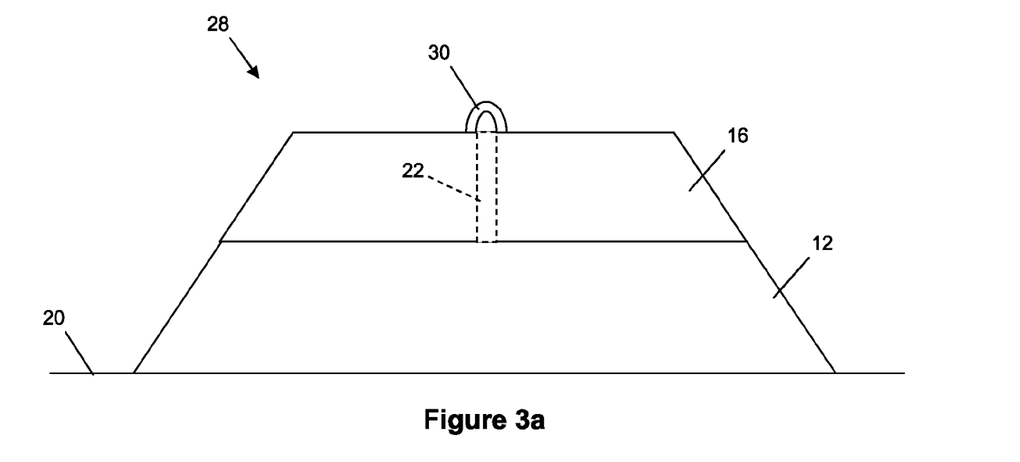
FIGS. 3a and 3b are schematic side views of an AUV basket in a third embodiment of the invention, showing a lid in closed and open positions respectively.
Figure 3B:
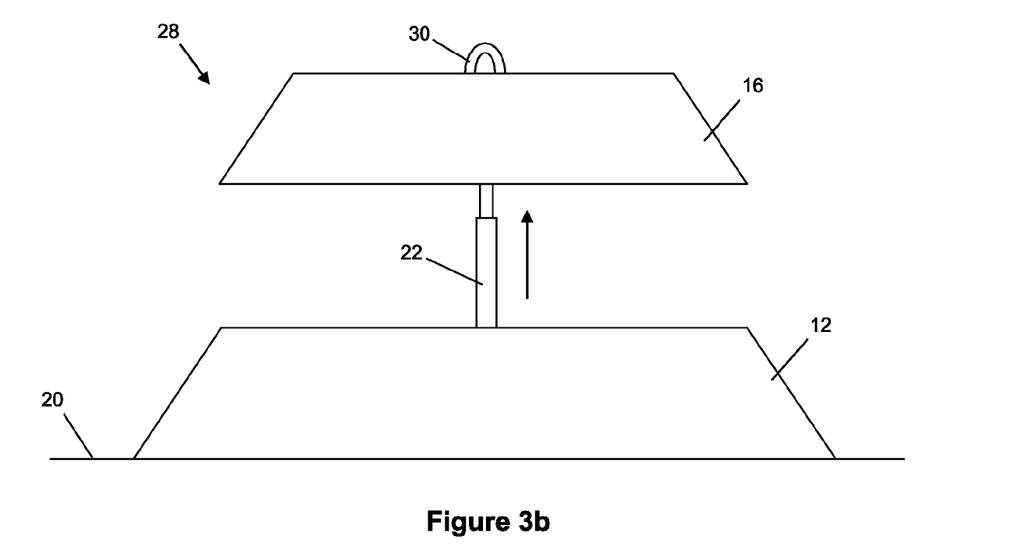

Turning next to the AUV basket 28 in the third embodiment shown in FIGS. 3a and 3b, this shows that a post 22 may be permanently deployed in an erect position but shrouded by the lid 16, when the lid 16 is closed, to avoid snagging on fishing nets. Thus, the lid 16 needs sufficient depth to accommodate the length of the post 22 protruding upwardly from the body 12. The lid has a top plate that lies over the post 22 and a skirt depending from the top plate that surrounds the post 22. So, like the second embodiment shown in FIGS. 2a to 2d, the lid 16 defines a substantial upper portion of the frusto-pyramidal sides 18 of the basket 28.

In this example, the lid 16 is in one section and moves up and down in a similar way to the lid 16 of the first embodiment shown in FIGS. 1a and 1b. However, the lid 16 could instead comprise two or more sections, like the second embodiment shown in FIGS. 2a to 2d. Also, the or each section of the lid 16 could instead slide laterally or pivot to open.

Conveniently, the post 22 of the basket 28 shown in FIGS. 3a and 3b is integrated into a telescopic actuator that supports and drives movement of the lid 16. However, it would be possible for the post 22 to be separate from the actuator or other means that support and move the lid 16. Also, there could be more than one post 22 and actuator, whether the post 22 and actuator are integrated together or separate from each other.

The third embodiment shown in FIGS. 3a and 3b has the further feature of a lifting eye 30 for attachment of a lifting line to relocate the basket 28 underwater or to lift the basket 28 to the surface. The lifting eye 30 is shown here atop the lid 16 but in other embodiments a similar lifting formation could instead be on the post 22 or on a structure extending from the post 22. It would also be possible for the lifting eye 30 to be collapsible or retractable when not in use so as not to present a snagging hazard.

Figure 4A:
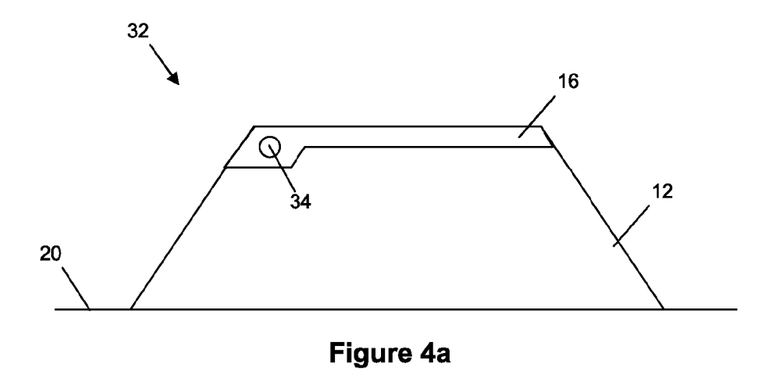
FIGS. 4a to 4c are a sequence of schematic side views of an AUV basket in a fourth embodiment of the invention, showing the basket closed, then open, and then with a post deployed.
Figure 4B:
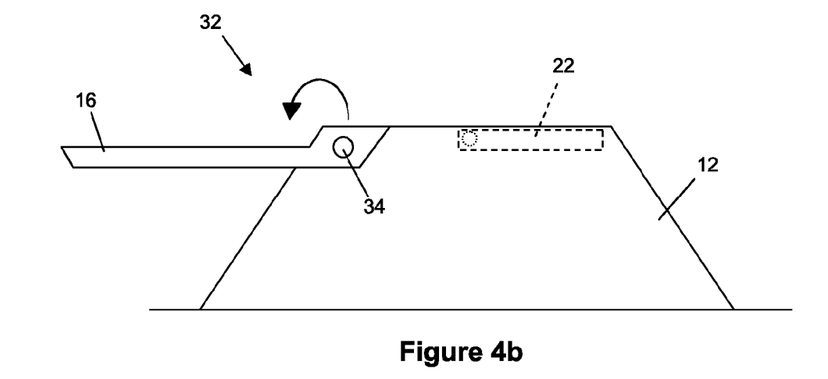
Figure 4C:
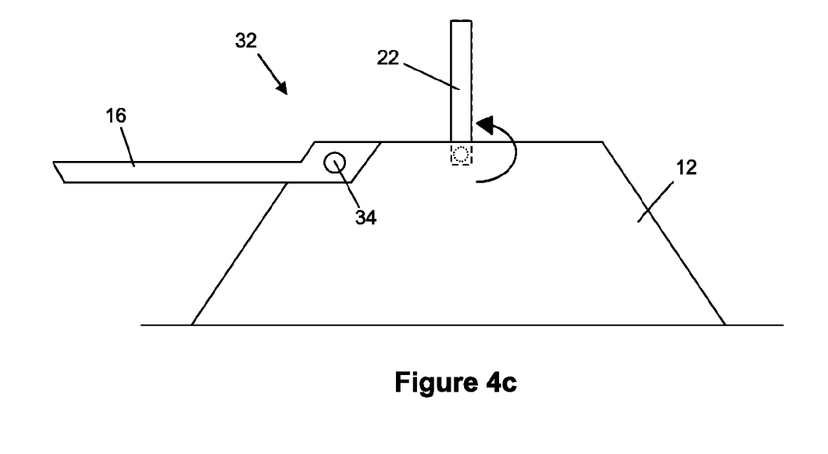

FIGS. 4a, 4b and 4c show an AUV basket 32 in a fourth embodiment of the invention. In this embodiment, the lid 16 swings relative to the body 12 about a horizontal pivot axis 34 from the closed position shown in FIG. 4a to the open position shown in FIG. 4b. With the lid 16 open, a post 22 then swings upwardly from an initially stowed position within the body 12 as shown in FIG. 4b to the deployed position shown in FIG. 4c. Again, upward translational movement of the post 22 relative to the body 12 would be possible as an alternative.

Figure 5A:
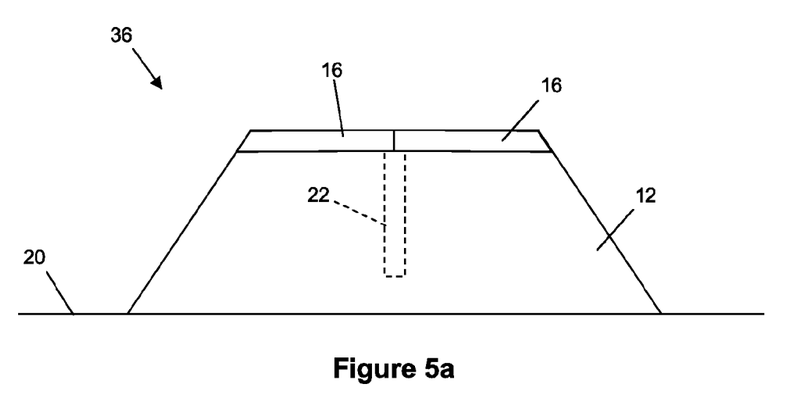
FIGS. 5a and 5b are schematic side views of an AUV basket in a fifth embodiment of the invention, showing a lid in closed and open positions respectively and with a post deployed in the latter view.
Figure 5B:
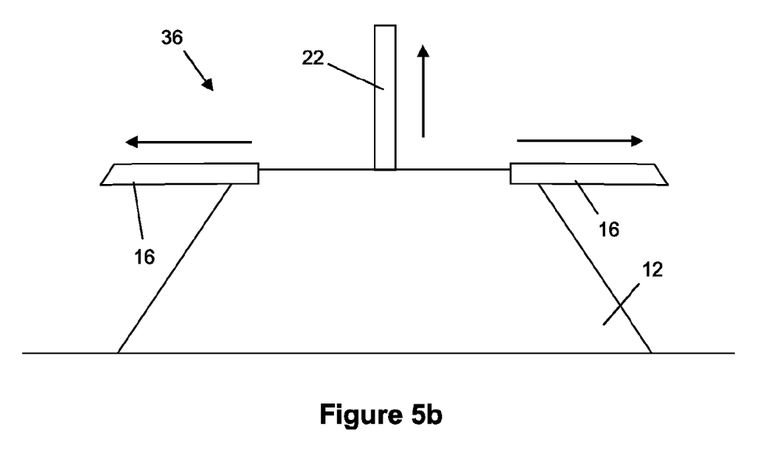

In the fifth embodiment shown in FIGS. 5a and 5b, the lid 16 of an AUV basket 36 is again divided into sections that slide laterally away from each other on opening to give access to the interior of the body 12.

FIG. 5a shows the lid 16 of the basket 36 closed. FIG. 5b shows the lid 16 opened and a post 22 deployed into an upright position over the body 12. In this example, the post 22 slides upwardly from an initially retracted position with translational movement but it could instead swing or pivot into the upright deployed position.

Figure 6A:
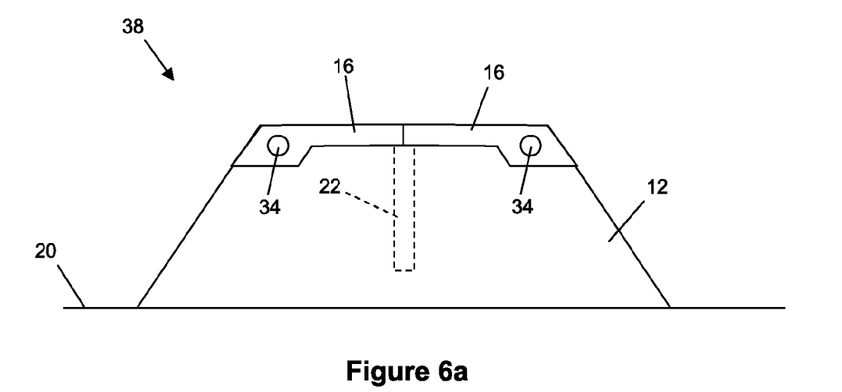
FIGS. 6a and 6b are schematic side views of an AUV basket in a sixth embodiment of the invention, showing a lid in closed and open positions respectively and with a post deployed in the latter view.
Figure 6B:
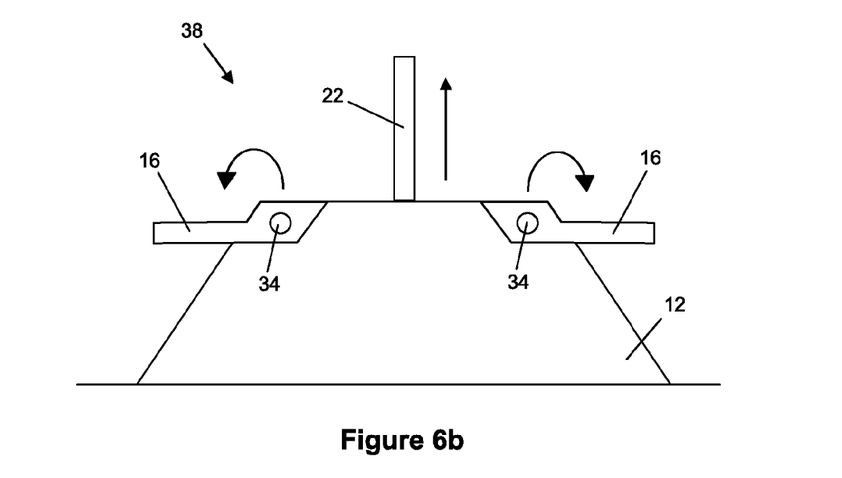

The sixth embodiment shown in FIGS. 6a and 6b is similar to the fifth embodiment in that the lid 16 of an AUV basket 38 is again divided into sections. However, in this example, the sections of the lid 16 pivot relative to the body 12 in opposite angular directions about respective parallel horizontal pivot axes 34, each to a respective side of the body 12. The post 22 then moves upwardly from an initially retracted position within the body 12 into an upright deployed position over the body 12, in this example by sliding but optionally instead by pivotal movement.

Figure 7A:
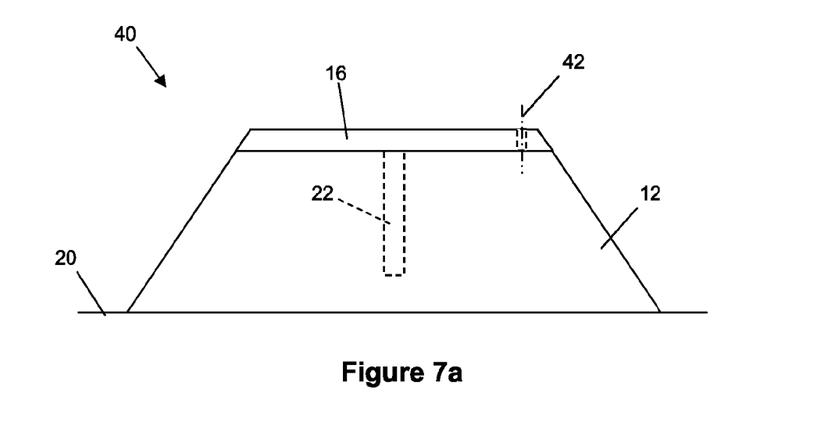
FIGS. 7a and 7b are schematic side views of an AUV basket in a seventh embodiment of the invention, showing a lid in closed and open positions respectively and with a post deployed in the latter view.
Figure 7B:
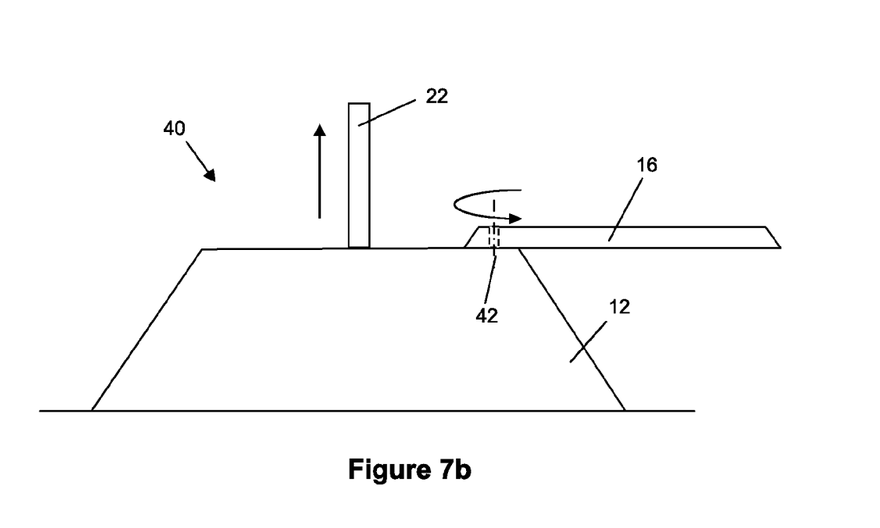

It is possible for the lid 16, or sections of the lid 16, to swing relative to the body 12 on other than an horizontal pivot axis. For example, in the seventh embodiment shown in FIGS. 7a and 7b, the lid 16 of an AUV basket 40 swings around a vertical pivot axis 42 to one side of the body 12 between the closed position shown in FIG. 7a and the open position shown in FIG. 7b. The post 22 then moves upwardly from an initially retracted position within the body 12 into an upright deployed position over the body 12, again in this example by sliding but optionally instead by pivotal movement about a horizontal axis.

Figure 8A:
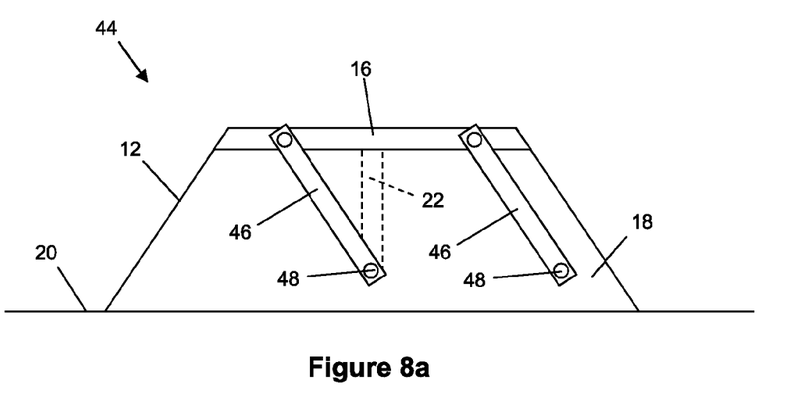
FIGS. 8a and 8b are schematic side views of an AUV basket in an eighth embodiment of the invention, showing a lid in closed and open positions respectively and with a post deployed in the latter view.
Figure 8B:
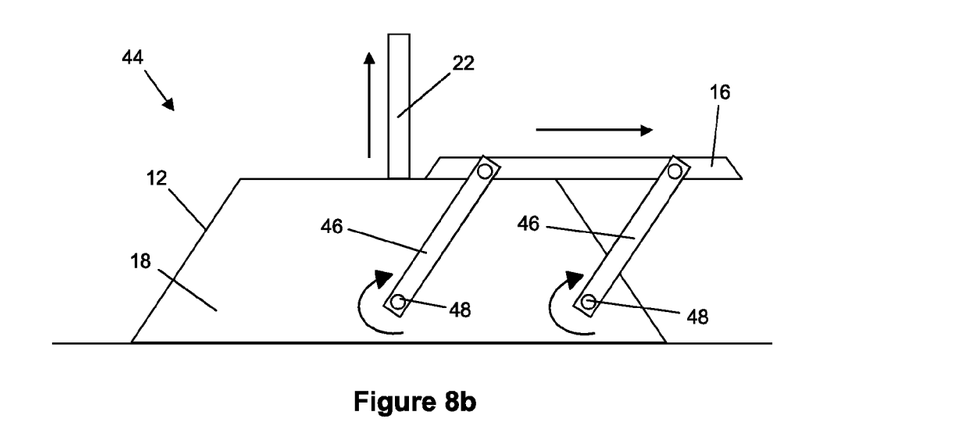

In the eighth embodiment as shown in FIGS. 8a and 8b, the lid 16 of an AUV basket 44 is part of a parallelogram linkage comprising parallel swinging arms 46. The arms 46 swing about respective parallel horizontal pivot axes 48 that intersect a sloping side 18 of the body 12. The lid 16 is in a single section in this example and remains substantially horizontal when moving between the closed position shown in FIG. 8a and the open position shown in FIG. 8b.

The arms 46 are outside the body 12 in the example shown in FIGS. 8a and 8b but could be inside the body 12 in other embodiments. In this example, the post 22 is implemented separately from the arms 46 but similar swinging arms could implement posts and also support the lid 16 for movement relative to the body 12.

Figure 9A:
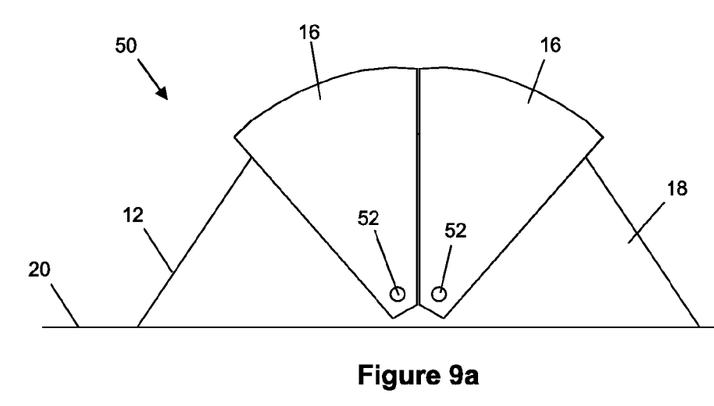
FIGS. 9a and 9b are schematic side views of an AUV basket in a ninth embodiment of the invention, showing a lid in closed and open positions respectively and with a post deployed in the latter view.
Figure 9B:
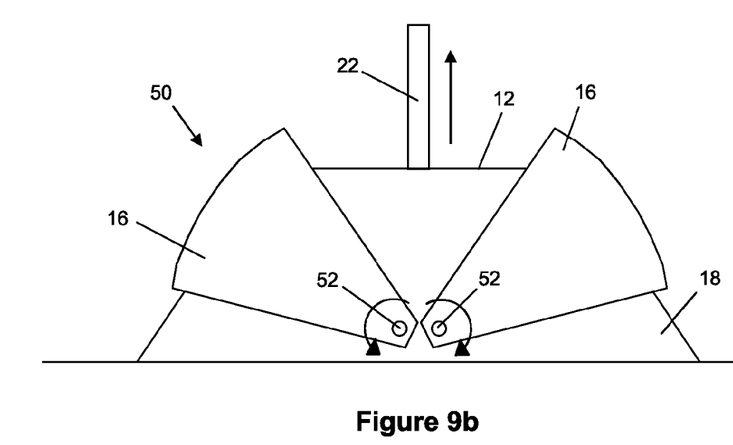

FIGS. 9*a* and 9*b* show an AUV basket 50 being a ninth embodiment of the invention. Here, the lid 16 of the basket 36 is divided into curved pivotable sections that close like a clamshell over the open top of the body 12. When closed together as shown in FIG. 9*a*, the sections of the lid 16 present a smoothly-rounded top profile of the basket 50 that minimises snagging hazards. On opening as shown in FIG. 9*b*, the sections of the lid 16 pivot away from each other outwardly and downwardly in opposite angular directions to give access to the interior of the body 12.

In this example, the sections of the lid 16 have respective parallel horizontal pivot axes 52 that each intersect opposed sloping sides 18 of the body 12. In principle, it would instead be possible for clamshell sections of the lid 16 to share the same pivot axis.

Turning finally to the tenth and eleventh embodiments shown in FIGS. 10*a*, 10*b*, 11*a* and 11*b* of the drawings, these examples show that it is also possible for a post 22 to be stowed outside the body 12 rather than moving into the deployed position from within the body 12. For example, in an AUV basket 54 in the tenth embodiment of the invention shown in FIGS. 10*a* and 10*b*, the post 22 is mounted externally to the body 12 on a horizontal pivot axis 56 that intersects a sloping side 18 of the body 12. When stowed, the post 22 lies compactly against the side 18 of the body 12 to avoid snagging fishing nets. When deployed, the post 22 swings up about the pivot axis 56 into the deployed position to protrude above the top of the body 12.

In this example, the lid 16 is arranged like that of the fifth embodiment shown in FIGS. 5*a* and 5*b* but it could be arranged in other ways, for example as exemplified by other embodiments of the invention described herein. It would also be possible for an externally-mounted post 22 to move in translation rather than pivotally.

Figure 10A:
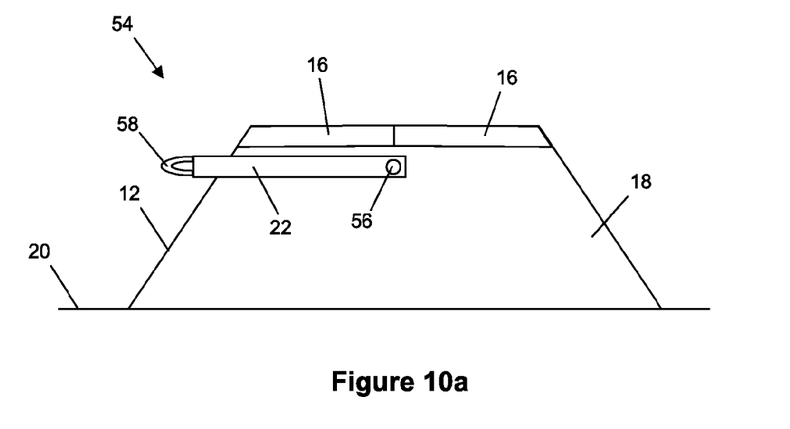
FIGS. 10a and 10b are schematic side views of an AUV basket in a tenth embodiment of the invention, showing a lid in closed and open positions respectively and with a post deployed in the latter view.
Figure 10B:
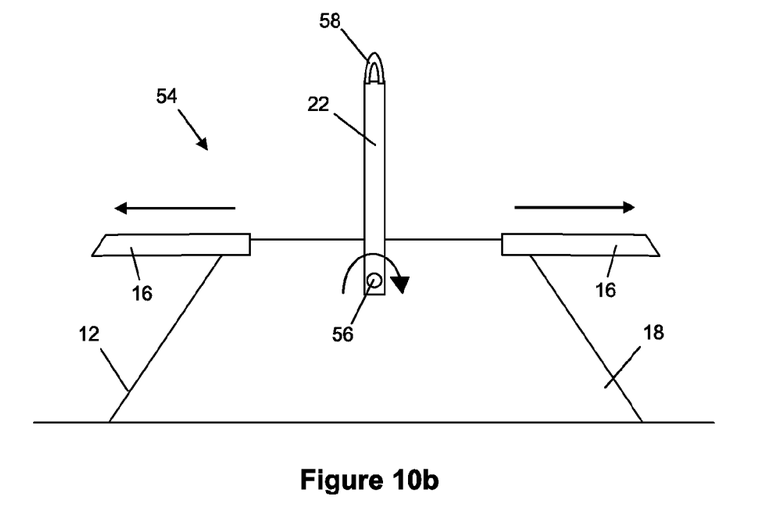

The post 22 shown in FIGS. 10*a* and 10*b* has a lifting eye 58 at its free end for attachment of a lifting line. This is convenient for relocating the basket 54 underwater or to lift the basket 54 to the surface. Similarly, a lifting eye can be provided on the posts of other embodiments herein.

Figure 11A:
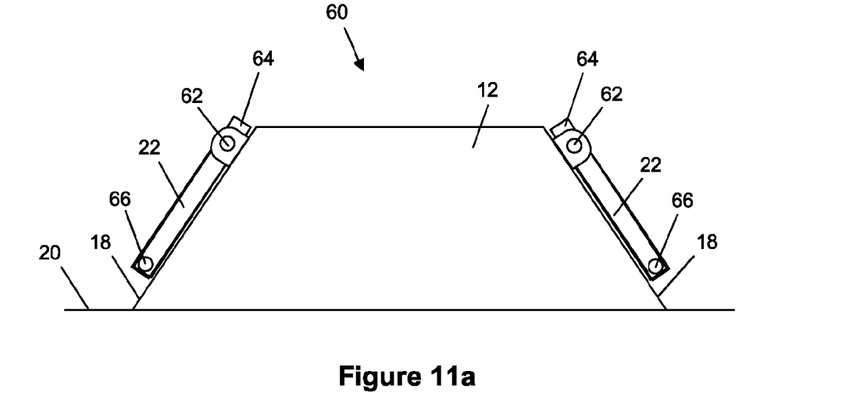
FIGS. 11a and 11b are schematic side views of an AUV basket in an eleventh embodiment of the invention, showing posts in folded and deployed positions respectively.
Figure 11B:
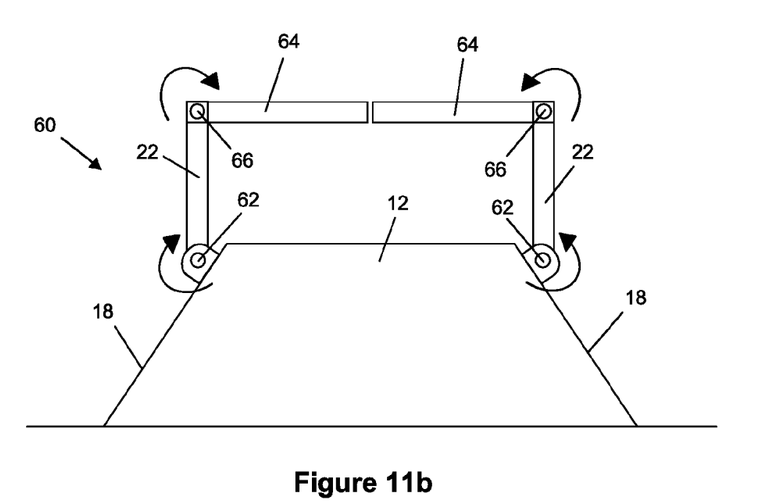

FIGS. 11*a* and 11*b* show an AUV basket 58 in the eleventh embodiment of the invention, having another externally-mounted post arrangement. Here, paired posts 22 may be stowed against opposed sloping sides 18 of the body 12. When stowed as shown in FIG. 11*a*, the posts 22 lie compactly against those sides 18 of the body 12 to avoid snagging fishing nets. When deployed as shown in FIG. 11*b*, the posts 22 swing into deployed positions in opposite angular directions about respective pivot axes 60 that are parallel to the respective sides 18 of the body 12.

In this example, the posts 22 are part of a lifting frame that further comprises a crossbar 62 in two sections. A respective section of the crossbar 62 is attached to each post 22 such that, when deployed, the sections of the crossbar 62 extend oppositely and orthogonally with respect to the associated posts 22. Pivots 64 between each post 22 and the attached section of the crossbar 62 allow the sections of the crossbar 62 to collapse compactly against the sloping sides of the body 12 when the posts 22 are stowed away.

It will be noted that the embodiment shown in FIGS. 11*a* and 11*b* does not have a lid like the preceding embodiments. This illustrates that it is possible for a lid to be omitted from any of the embodiments herein so that an AUV is simply received in an open-topped body having one or more retractable posts that can protrude above the level of the open top. The body provides access through its open top to a receptacle in which the AUV is surrounded and protected from lateral impacts. Thus, the body can cope with overtrawling when the posts and any related structures are stowed away within the body or against the sloped sides of the body.

In each of the embodiments herein, the posts shown may be part of a frame comprising at least one pair of posts joined by at least one crossbar, like that disclosed in U.S. Pat. No. 8,109,223.

The invention claimed is:

1. A subsea garage for an un ne underwater vehicle (UUV), the garage comprises:
    a body having a receptacle for the UUV, and an open top providing a transit path for the UUV into and out of the receptacle;
    a base opposed to the open top, the base being arranged to lie on the seabed; and
    at least one post that is movable, subsea, relative to the body into a deployed position extending upwardly from the body above the open top and into a retracted position substantially beneath the open top;
    wherein the or each post is accommodated within the body when in the retracted position.

2. The subsea garage of claim 1, wherein the or each post translates when moving relative to the body into the deployed position.

3. The subsea garage of claim 1, wherein the or each post rotates when moving relative to the body into the deployed position.

4. The subsea garage of claim 1, wherein the each post has a lifting formation for attachment to a listing line to lift the subsea garage.

5. The subsea garage of claim 1, further comprising a crossbar structure attached to the or each post.

6. The subsea garage of claim 5, wherein the crossbar structure has a lifting formation for attachment to a lifting line to lift the subsea garage.

7. The subsea garage of claim 1, and being responsive to a command from, or presence of, the UUV to move the each post into the deployed position.

8. The subsea garage of claim 1, further comprising a lid that is movable, subsea, relative to the body between a closed position that closes the open top and an open position that allows the UUV to move along the transit path through the open top.

9. The subsea garage of claim 8, wherein the or each post is linked to the lid to move the lid into the open position on deployment of the post.

10. The subsea garage of claim 8, wherein the or each post is linked to the lid to be deployed in response to movement of the lid into the open position.

11. The subsea garage of claim 8, wherein the or each post is movable relative to the body for deployment after opening movement of the lid.

12. The subsea garage of claim 8, wherein the lid is arranged to lift from the closed position to the open position while remaining over the open top of the body.

13. The subsea garage of claim 8, wherein the lid is arranged to translate laterally from the closed position to the open position.

14. The subsea garage of claim 8, wherein the lid is arranged to rotate from the closed position to the open position.

15. The subsea garage of claim 14, wherein the lid is arranged to rotate about a substantially horizontal axis offset to a side of the body.

16. The subsea garage of claim 14, wherein the lid is arranged to rotate about a substantially vertical axis offset to a side of the body.

17. The subsea garage of claim 8, wherein the lid is in sections that are arranged to move apart from each other as the lid moves from the closed position into the open position.

18. The subsea garage of claim 17, wherein the sections of the lid are arranged to move downwardly as they move apart.

19. The subsea garage of claim 8, wherein the lid has a lifting formation for attachment to a lifting line to lift the subsea garage.

20. The subsea garage of claim 8 and being configured to respond to a command from, or presence of, the UUV to move the lid into the open position.

21. A subsea garage for an unmanned underwater vehicle (UUV) a, the garage comprising:
 a body having a receptacle for the UUV, an open top providing a transit path for the UUV into and out of the receptacle and a base opposed to the open top, the base being arranged to lie on the seabed;
 at least one post extending upwardly from the body above the open top; and
 a lid that is movable subsea relative to the body between a closed position that closes the open top and an open position that allows the UUV to move along the transit path through the open top;
 wherein the lid encloses and shrouds the post when in the closed position such that the post is fully covered by the lid in the closed position and exposes the post when in the open position, and wherein the lid comprises a top plate that lies over the post in the closed position and a skirt depending from the top plate, which skirt lies beside the post when the lid is in the closed position.

22. The subsea garage of claim 21, wherein the skirt of the lid extends from the top plate to the open top of the body when the lid is in the closed position.

23. The subsea garage of claim 21, wherein the lid is arranged to lift from the closed position to the open position while remaining over the open top of the body.

24. A method of guiding an unmanned underwater vehicle (UUV) into or out of a subsea garage that has an open-topped body, the method comprising:
 moving at least post of the subsea garage relative to the body, subsea, from a retracted position, in which the or ach post is accommodated within the body, into a deployed position extending upwardly above the open top of the body; and
 with reference to the or each post, navigating the UUV along a transit path through the open top into or out of a receptacle within the body.

25. The method of claim 24, comprising moving the or each post in response to a command from, or presence of, the UUV.

26. The method of claim 24, preceded or followed by lifting the subsea garage while bearing its weight through at least one post when in the deployed position.

27. The method of claim 24, comprising moving a lid relative to the body, subsea, between a closed position that closes the open top and an open position that allows the UUV to move along the transit path through the open top.

28. The method of claim 27, comprising moving the or each post into the deployed position with the lid as the lid moves into the opens position.

29. The method of claim 27, comprising moving the or each post into the deployed position after moving the lid into the open position.

30. The method of claim 24, preceded or followed by lifting the subsea garage while bearing its weight through the lid when in the closed position.

31. The method of claim 24, wherein the or each post is in the deployed position during any of the following phases:
 entry of the TRW into the subsea garage;
 exit of the UUV from the subsea garage; and
 docking or undocking of the UUV in or from the subsea garage.

32. The method of claim 24, wherein the or each post is in the retracted position whenever:
 the UUV is not entering or exiting the subsea garage; and
 the subsea garage is not being lifted.

33. A method of guiding an unmanned underwater vehicle (UUV) into or out of a subsea garage having an open-topped body, the method comprising:
 exposing, subsea, at least one previously-enclosed post that extends upwardly above the open top of the body by moving a lid relative to the body between a closed position that closes the open top and in which the post is shrouded by the lid such that the post is fully covered by the lid, and an open position that allows the UUV to move along a transit path through the open top, the lid comprising a top plate that lies over the post in the closed position and a skirt depending from the top plate, which skirt lies beside the post when the lid is in the closed position; and
 with reference to the or each post, navigating the UUV along the transit path through the open top into or out of a receptacle within the body.

34. The method of claim 33, comprising moving the lid in response to a command from, or presence of, the UUV.

* * * * *